United States Patent
Hu et al.

(10) Patent No.: US 7,539,888 B2
(45) Date of Patent: May 26, 2009

(54) MESSAGE BUFFER FOR A RECEIVER APPARATUS ON A COMMUNICATIONS BUS

(75) Inventors: Carl C. Hu, Carmel, IN (US); Kim R. Gauen, Noblesville, IN (US)

(73) Assignee: Freescale Semiconductor, Inc., Austin, TX (US)

( * ) Notice: Subject to any disclaimer, the term of this patent is extended or adjusted under 35 U.S.C. 154(b) by 311 days.

(21) Appl. No.: 11/395,781

(22) Filed: Mar. 31, 2006

(65) Prior Publication Data

US 2007/0230484 A1    Oct. 4, 2007

(51) Int. Cl.
*G06F 1/32* (2006.01)
(52) U.S. Cl. ......................... 713/324; 713/320
(58) Field of Classification Search .................. 713/300, 713/320, 323, 324
See application file for complete search history.

(56) References Cited

U.S. PATENT DOCUMENTS

| | | | | |
|---|---|---|---|---|
| 5,142,684 | A * | 8/1992 | Perry et al. | 713/320 |
| 6,728,892 | B1 * | 4/2004 | Silvkoff et al. | 713/320 |
| 2003/0144783 | A1 * | 7/2003 | Drummond et al. | 701/49 |
| 2005/0102430 | A1 | 5/2005 | Huber et al. | |
| 2005/0160301 | A1 * | 7/2005 | Disser | 713/310 |
| 2006/0039504 | A1 | 2/2006 | Sicard | |
| 2006/0050735 | A1 | 3/2006 | Isaac et al. | |

OTHER PUBLICATIONS

International Search Report and Written Opinion Regarding PCT/US07/62536 Dated Jul. 2, 2008.

* cited by examiner

*Primary Examiner*—Dennis M Butler
(74) *Attorney, Agent, or Firm*—Dillon & Yudell LLP

(57) ABSTRACT

A Controller Area Network (CAN) node consists of a high-powered microcontroller, a low standby power regulator, a CAN bus transceiver, and a minimal CAN message buffer for storing received messages. Low power standby operation allows for the controller to power off, while the transceiver and regulator are operated in standby. The transceiver/regulator will enter run mode after the first symbol of a received CAN message is validated off the bus. As the original CAN message is received, it is buffered in the message buffer and, after stored, a status register is set to indicate the full message has been received. Once the controller has stabilized out of a wake-up mode, it retrieves the stored message and acts accordingly. The CAN message buffer is coupled to the controller by an system packet interface (SPI) interface for transmission of a controller wake-up command and retrieval of a buffered message.

10 Claims, 3 Drawing Sheets

MESSAGE BUFFER FOR A RECEIVER APPARATUS ON A COMMUNICATIONS BUS

BACKGROUND OF THE INVENTION

1. Field of the Invention

This invention relates to a receiver apparatus for a communications bus, and in particular to a management unit for a receiver apparatus on a communications bus.

2. Description of the Related Art

Local networks often make use of a communications bus over which a set of nodes communicates. A driver module in a controller node transmits step-change signals over the bus to receivers in remote controlled nodes. The step-change signal activates the multiplexed remote nodes connected to the bus, and the bus also selectively transmits signals from the remote nodes back to a receiver in the controller node.

Historically, in automotive applications, functions such as door locks, seat positions, electric mirrors, and window operations have been controlled directly by electrical direct current delivered by wires and switches. Such functions may today be controlled by ECUs (Electronic Control Units) together with sensors and actuators in a multiplexed Controller Area Network (CAN). The Controller Area Network (CAN) standard (ISO 11898) allows data to be transmitted by switching a signal, at a frequency of 10 Kbauds to 1 Mbaud for example, to the multiplexed receiver modules over the differential pair cable. The receiver modules may be actuators that perform a function, for example by generating mechanical power required, or sensors that respond to activation by making measurements and transmitting the results back to the ECU over the bus.

A variant on the CAN standard is the LIN (Local Interconnect Network) sub-bus standard (see ISO 7498), to provide connection to local network clusters. A LIN sub-bus system uses a single-wire implementation (enhanced ISO9141), which can significantly reduce manufacturing and component costs. Component costs are further reduced by self-synchronization, without crystal or ceramics resonator, in the controlled node. The system is based on common universal asynchronous receiver and transmitter serial communications interface (UART/SCI) hardware that is shared by most microcontrollers, for a more flexible, lower-cost silicon implementation. Other standards for step-change signals over a communication bus are the Flexray and MOST standards.

Typically, the controller node comprises a microcontroller unit (MCU) that generates the signals to be transmitted and processes the signals received. The controller node also includes a unit for selectively supplying power to the controlled nodes and other modules of the controller node and sending signals controlling the operating state of the controlled nodes and the other controller node modules. Typically, the complete vehicle system comprises more than one controller node and sub-networks.

Reducing power consumption of the nodes of such networks, especially of the controller node, is often critical, especially during waiting periods when the controlled nodes are inactive. This is the case in automotive applications, for example, when a vehicle is parked. The nodes are designed with various degrees of standby, sleep, and stop modes, in which part or all of the operating functions are halted or the power supplies to part of the modules within the nodes are switched off. However, waking the functions up and restoring supplies to the switched off modules to retrieve the normal run condition of the module or node introduces a greater or lesser delay that may be more or less acceptable for a given function.

Another driver for utilization of sleep and stop modes is the increasing demand on processing power for the CAN nodes, which has the effect of pushing the MCUs into faster and greater power-demanding processes. As more processing intensive MCUs are being utilized in CAN networks, deeper sleep states are required to avoid the excessive standby currents generated by such high powered controllers. As a result, system power controllers now allow very low sleep state currents in which power consumption is reduced and one or more clocks are stopped. Unfortunately, this trend increases the wake-up time of such powerful processors because the clocks need to restart and stabilize.

As will be appreciated, use of sleep and stop modes to decrease power consumption has created a problems in typical multiplexed bus systems with minimum controller wake-up requirements, and particularly in CAN networks where these minimum wake-up and response time are becoming increasingly shortened. This problem has been solved in the past by requiring that either the module be kept in a fully awake mode or that the first message off the bus be discarded while the controller recovers from its long wake-up period and then is resent after the module's MCU is fully awake. As a result of the deep sleep or stop modes of CAN nodes, the corresponding information in the first CAN message received off the bus is typically lost because that node's MCU cannot wake up sufficiently fast to decipher the first message. These solutions present significant reductions in performance and response time of the node.

In other solutions, an auxiliary MCU is used in conjunction with the main MCU within the node. Upon receiving the message off the CAN bus, the multiplex physical layer sends a "wake" message to the auxiliary MCU, which reacts more quickly to the wake message than the main MCU. The auxiliary MCU can remain in a sleep state, while retaining a relatively low quiescent current. The more powerful main MCU is typically shut down in this mode. Upon awakening, the auxiliary MCU enables the regulator to power up the main MCU. Thereafter, messages can be transmitted and received onto the CAN bus from the main MCU through the multiplex physical layer. However, adding an additional MCU increases costs significantly.

As can be seen, there is a need for CAN nodes with high performance MCUs that draw very low quiescent current in a sleep state, and yet can respond quickly to receive and decipher the first incoming message on the CAN bus. Prior solutions have required keeping the controller powered at all times, adding a second smaller controller for use while the more powerful controller awakens, or resending of the first message once the node's controller has awoken. As can be seen, there is a need for a more efficient solution that does not use the first message solely as a controller wake-up message.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

In the following detailed description of preferred embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a CAN communication device in an automotive vehicle, it will be appreciated that the present invention is not so limited and that it has application to other embodiments of multiplexed communication networks.

Figure 1:
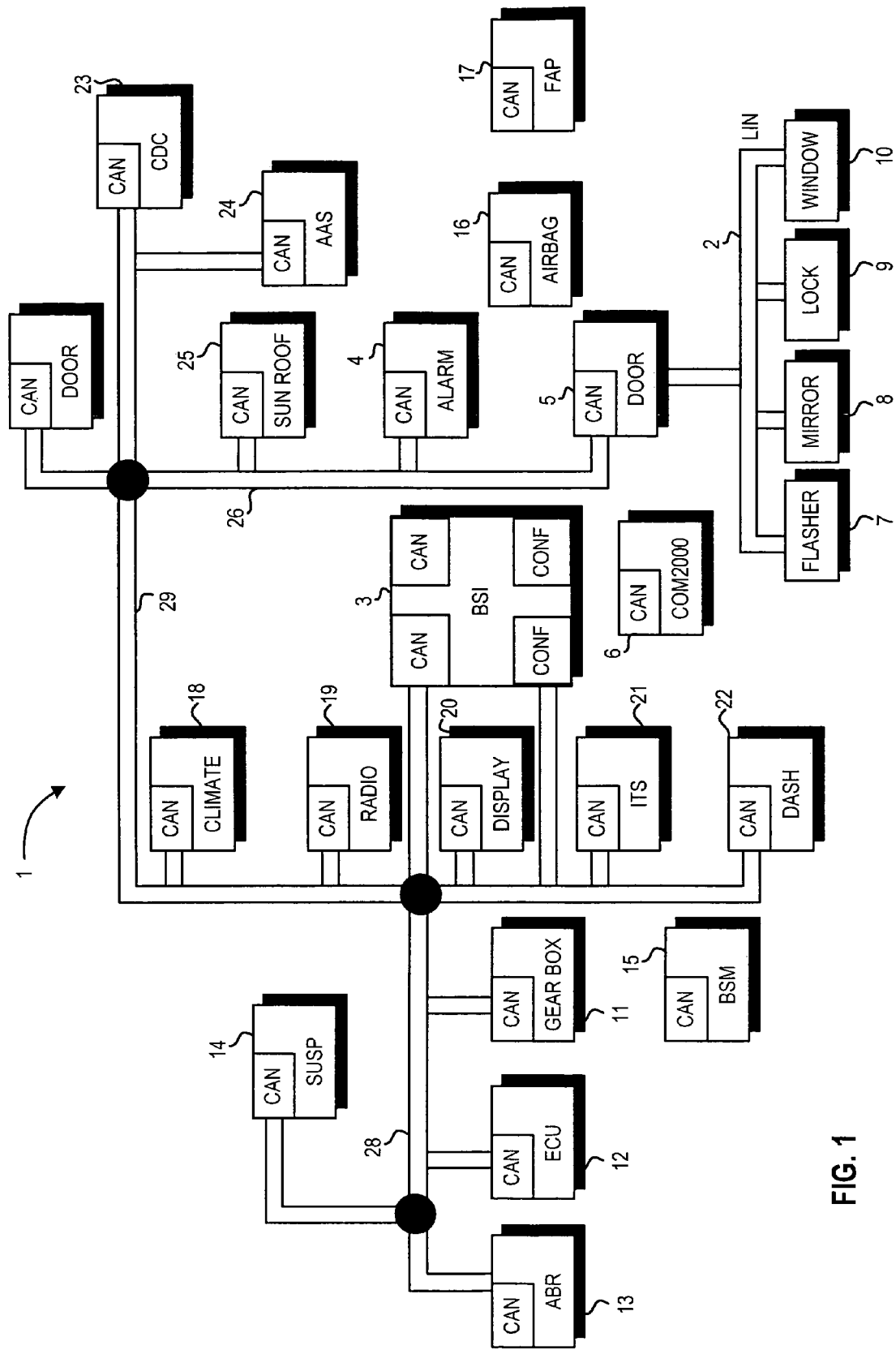
FIG. 1 shows a block diagram of a communication bus system for an automotive vehicle, in accordance with a preferred embodiment of the present invention.

With reference now to the figures, and in particular with reference to FIG. 1, there is shown a block diagram of a communication bus system for an automotive vehicle, in accordance with a preferred embodiment of the present invention. The CAN bus 1 communicates with a first category of nodes that must remain active with short reaction times even while the vehicle is parked. The first category of nodes includes a central control and gateway node 3, an intrusion alarm node 4, a door node 5, and a communications node 6 for an RF communications unit.

In this example of a vehicle communication bus system, the door node 5 also communicates over a LIN bus 2, with a LIN node 7 controlling external flasher operations, a node 8 controlling rear view mirrors, a door lock node 9 controlling the door locks for a remote key entry system, and a window node 10 controlling motors for window opening and shutting.

The CAN bus 1 also communicates with a second category of nodes that do not need to remain active with short reaction times while the vehicle is parked. The second category of nodes includes a node 11 controlling the gearbox, a node 12 controlling the engine control unit, a node 13 controlling the anti-lock braking system, and a node 14 controlling the suspension control unit. The second category of nodes also includes a node 15 for the front control unit, a node 16 controlling the airbag system, and a node 17 controlling the particle filter. The second category of nodes also includes nodes 18 to 24 controlling respectively the climate control, the radio and hi-fi set, a display unit, an IT system, the dashboard equipment, a CD player, a parking assistance unit, and a sunroof.

It will be appreciated that the above vehicle system is given by way of example only, and the configuration of the CAN bus, with or without the LIN bus, can be adapted to the requirements of any particular network.

In this example, the CAN bus 1 comprises a first line 26 for communications between a first port of the central control node 3 and the nodes 4, 5 and 25; a second line 27 for communications between a second port of the central control unit 3 and the nodes 6, 15, 16 and 17; a third line 28 for communications between a third port of the central control unit 3 and the nodes 11 to 14; and a fourth line 29 for communications between a fourth port of the central communications unit 3 and the nodes 18 to 24.

The requirements for response time of the nodes 3 to 6 of the first category and, in particular, for their wake-up time is of the order of 100 microseconds or less. In addition, since these units must be capable of responding to an input signal even when the car is in the parked mode, they must remain supplied with electrical power and they must be capable of operating in a quiescent mode with a very low current consumption, as low as possible but in any case substantially lower than one milliamp.

Figure 2:
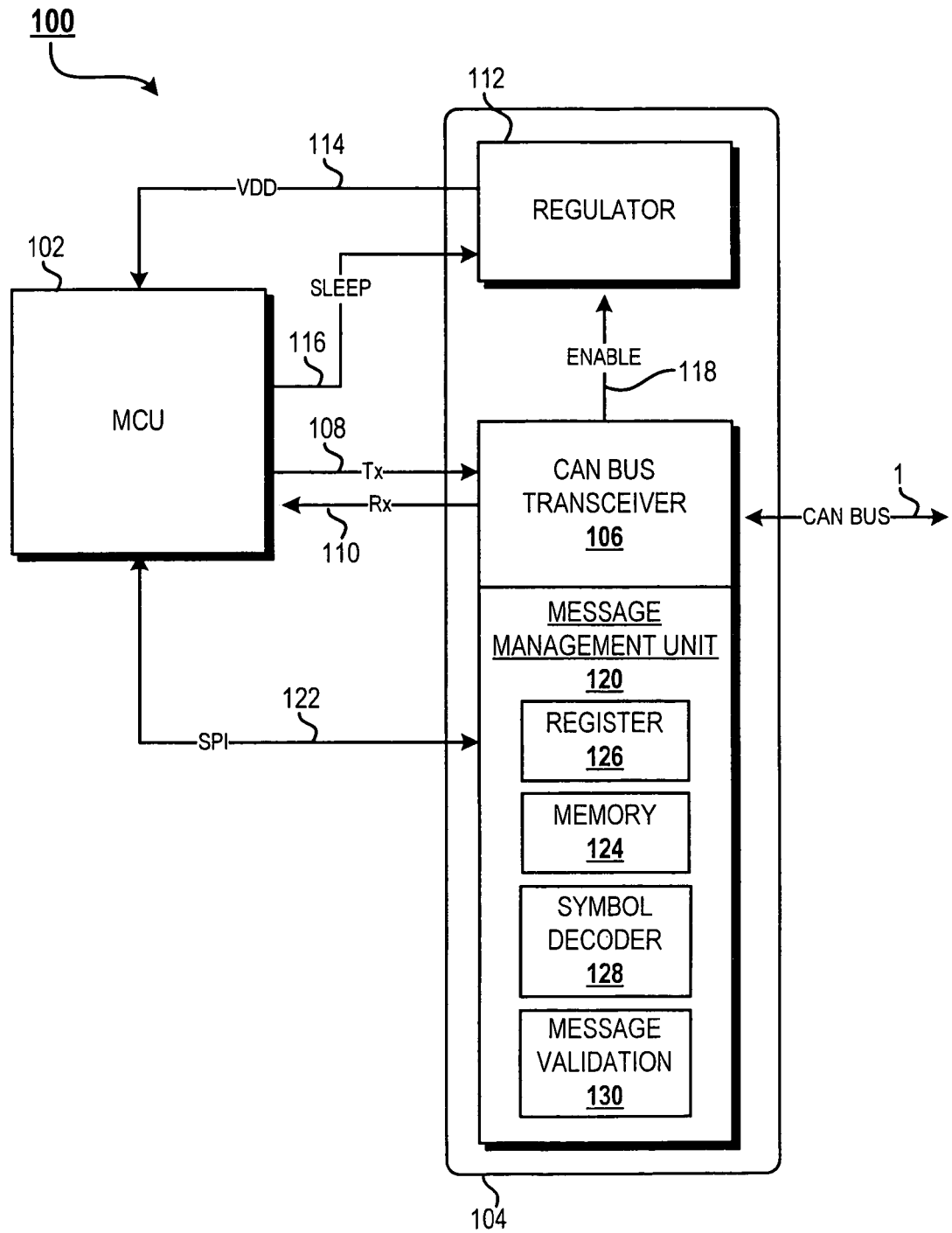
FIG. 2 shows a block diagram of a CAN node, in accordance with the preferred embodiment of the present invention.

FIG. 2 shows a block diagram of a CAN node, in accordance with the preferred embodiment of the present invention. CAN node 100 is suitable as a CAN controller node within a CAN bus system, for example one of the first category of nodes 3 to 6 shown in FIG. 1. CAN node 100 includes a micro-controller unit ("MCU") 102 comprising memory and data processing functions (not shown) for generating signals to be transmitted and for processing signals received over the CAN communication bus 1. Node 100 further includes a management unit 104 that includes a multiplex physical layer (CAN Bus Transceiver) 106 (also called the "controlled interface")that operates as the CAN interface coupled between the CAN bus 1 and the MCU 102 to transmit messages received from MCU 102 over bus 108 onto CAN bus 1 and to forward received messages from CAN bus 1 to MCU 102 over connection 110. The CAN bus physical layer can be implemented merely as an edge detector in a low end implementation to a full transceiver in a high end implementation, an alternative preferred embodiment of the present invention.

In preferred embodiment, multiplex bus transceiver 106 includes message symbol decode logic for decoding messages received off of CAN bus 1 and determining if the message is intended for receipt by MCU 102. Further, other CAN interfaces may be provided between other ports of the MCU 102 and other lines of the CAN bus 1. MCU 102 and management unit 104 comprise separate components, modules or chips, or may be integrated into a single module or integrated circuit in various embodiments.

Management unit 104 (also called the "power interface") also includes a power control regulator 112 that supplies power ("VDD") to MCU 102 at a low or high power setting. Regulator 112 is controlled to set VDD 114 (also called the "power control signal")at a low power or "sleep" state by signal 116 provided by MCU 102. By enabling the sleep signal 116 or going into a low power mode, MCU 102 places itself in a very low current mode where a minimum of current is drained to allow minor background operations. Regulator 112 also receives an enable signal 118 from CAN bus transceiver 106 that enables output power VDD 114 to MCU 102. CAN bus transceiver 106 sets enable 118 upon receiving a message over CAN bus 1 intended for MCU 102. Regulator 112 has a low sleep state current capability that is enabled when enable signal 118 is not received. Management unit 104 also may include a simple local oscillator or time base (not shown) and a control block (not shown) that can be implemented as a state machine, or combinatoric logic, or linear feed back shift register.

In accordance with a preferred embodiment of the present invention, management unit 104 also includes a message management unit 120. In one embodiment, message management unit 120 is a limited-capacity message buffer module that stores CAN messages received by CAN bus transceiver 106 off of CAN bus 1. Message management unit 120 includes a memory buffer 124 (also called the"message buffer") for storing the CAN messages, a status register 126, a symbol decoder 128 for decoding CAN messages received over CAN bus 1, and message validation logic 130 for confirming that a message is intended for receipt by MCU 102.

In one embodiment, multiplex bus transceiver 106 includes message symbol decode logic 128 for decoding messages received off of CAN bus 1 and determining if the message is intended for receipt by MCU 102. Clock recovery in the symbol decoder block 128 is simplified by using a reduced oscillator accuracy clock recovery mechanism, as it does not operate over the full range of possibilities. This has the effect of reducing the accuracy needs of the local oscillator to the point where an internal oscillator may be used. For example, a scheme where the received edges coming off the CAN bus are used as a way to adjust or calibrate the local oscillator can be used to boost the performance of a less accurate local oscillator to the requirements of the system. This is a key complexity reducer of the implementation as a much simpler clock recovery mechanism may be employed in the symbol decoder for full CAN bus operation.

Messages buffered by message management unit 120 are passed between the message management unit 120 and MCU 102 over microprocessor interface 122. This interface may comprise a discreet interrupt, wake-up request line, I²C (Inter-Integrated Circuit) bus, parallel address/data bus or a system packet interface (SPI) in preferred embodiments. In addition to communicating buffered messages, microcontroller interface 122 provides a means for waking up the MCU from its sleep or stop state, communicating control signals to indicate to the MCU the presence of a message received over the CAN bus, and allowing for the retrieval of the message.

In accordance with the preferred embodiment, the MCU 102 is placed in a powered off state in certain preferred modes of low-power operation. Allowing the MCU to shut down permits use of high-powered MCUs that have undesirable sleep-state quiescent currents in CAN network designs. In the module's low power operation, the management unit 104 is operated in a low power standby condition. As a CAN message is received over CAN bus 1, the management unit 104 will validate the first symbol received off of CAN bus 1. Upon validation, management unit 104 turns on the internal regulator 112 via enable signal 118 to enter both MCU 102 and management unit 112 into a full operational run mode. In an alternative embodiment, management unit 104 will optionally request the MCU 102 to wake up by transmitting a "wake-up" command over the microprocessor interface 122.

As the original CAN message is received over CAN bus 1, it is immediately buffered in memory 124 of message management unit 120. Once the complete message has been buffered, message management unit 120 indicates in its status register 126 that a full message has been received by management unit 104. Once MCU 102 has stabilized from its power-up from the wake-up mode signaled by regulator 112 via VDD 114, it will access register 126 over interface 122 and identify that the status register indicates a full message has been received. Upon identifying a message received, MCU 102 retrieves the original first message received off CAN bus 1 from memory 124 via microprocessor interface 122 and performs in accordance with the received message. In this way, node 100 wakes from a sleep mode involving a stopped MCU upon receipt of a CAN message and can act accordingly without requiring the CAN bus system to retransmit a second copy of the original message, thereby enhancing overall CAN bus system performance.

Figure 3:
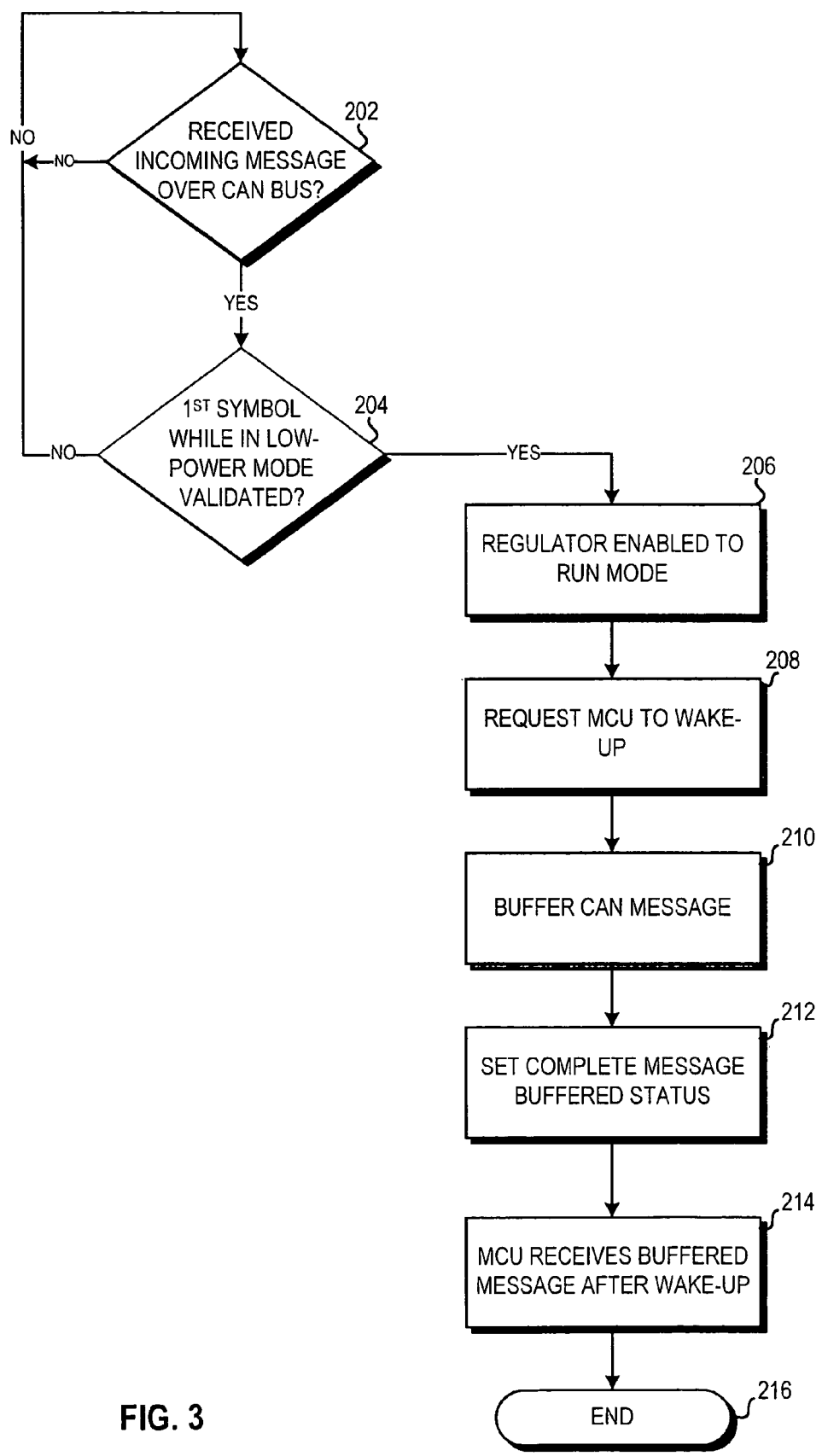
FIG. 3 shows a flow diagram of a method for CAN message buffering in accordance with a preferred embodiment of the present invention.

With reference now to FIG. 3, there is shown a flow diagram of a method for CAN message buffering in accordance with a preferred embodiment of the present invention. As shown at step 202, the message management unit of a CAN node monitors the CAN bus to detect when an incoming message is received. At step 204, the first symbol of a received message is detected and validated by the transceiver in the message management unit, while the transceiver remains in a low-power mode. If the first symbol is not validated as indicating a message for the MCU in the CAN node, the transceiver remains in the low-power state and continues to monitor the CAN bus for received messages at step 202. In some embodiments, the MCU may be held in a power-off state or mode of operation until a message is validated for that node. If the message is intended for the MCU, the process proceeds to step 206 where the transceiver powers the internal regulator into a run mode for powering the module, including the MCU. Thereafter, in a preferred embodiment, a next step 208 comprises the message management unit 120 making a request for the MCU to enter a wake-up mode of operation, and, in one embodiment, starting its clocks. This step can occur when the MCU has been in a power-off state prior to the message receipt. Step 210 shows message management unit 120 storing the received CAN message in its message buffer. Thereafter, as shown in step 212, the message buffer sets a status register once the complete message has been buffered. Next, as shown at step 214, the MCU retrieves the buffered message from the message buffer after completing the power-up sequence, and thereafter the process ends as shown at step 216.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, or semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A system within a node of a multiplexed communication system, wherein the node includes a controller for communication over a multiplexed bus, the system comprising:

a transceiver coupled to a bus configured for receiving and transmitting messages over the bus;

a message buffer for storing one or more messages received by the transceiver;

a power interface that generates a power control signal suitable for coupling to a controller, wherein the controller enters a power-on state in response to the power control signal; and a controller interface suitable for coupling to a communication bus coupled to the controller providing communication between the message buffer and the controller, wherein the controller interface is configured to transfer a message stored in the message buffer to the controller;

wherein the controller interface is configured to send, in response to validating a received message for the controller, a request via the controller interface that the controller wake-up.

2. The system of claim 1, wherein the multiplexed communication system is a Controller Area Network (CAN).

3. The system of claim 1, wherein power control signal is a power supply voltage.

4. The system of claim 1, wherein the controller operates in a power-off mode prior to receiving the power control signal.

5. The system of claim 1, further comprising a symbol decoder for decoding a received message.

6. The system of claim 1, further comprising message validation logic for validating that a received message is intended for the controller.

7. The system of claim 1, further comprising a power supply regulator coupled to the power interface for receiving an enable signal, wherein the power supply regulator enters into a power-on state in response to the enable signal to provide the controller coupled thereto with sufficient power for power-on operation.

8. The system of claim 1, further wherein the controller interface is configured to transfer a message stored in the message buffer to the controller in response to an indication that the controller has completed a wake-up mode of operation.

9. The system of claim 1, wherein the controller interface is further configured to set a status register when the message buffer has completed storing a received message, and wherein the register is configured to allow the controller to read the status register and retrieve a buffered message in response to the setting of the status register.

10. The system of claim 1, wherein the controller interface is a SPI bus.

\* \* \* \* \*